(No Model.)

M. SATTLEY.
CULTIVATOR.

No. 422,543. Patented Mar. 4, 1890.

ATTEST
Helen Graham
W. W. Graham

INVENTOR
M. Sattley
By L. P. Graham.
his attorney

United States Patent Office.

MARSHALL SATTLEY, OF TAYLORVILLE, ILLINOIS, ASSIGNOR OF ONE-HALF TO ARCHIBALD SATTLEY, OF SAME PLACE.

CULTIVATOR.

SPECIFICATION forming part of Letters Patent No. 422,543, dated March 4, 1890.

Application filed September 16, 1889. Serial No. 324,030. (No model.)

*To all whom it may concern:*

Be it known that I, MARSHALL SATTLEY, of Taylorville, in the county of Christian and State of Illinois, have invented certain new and useful Improvements in Cultivators, of which the following is a specification.

My invention relates to trip-shanks and means for adjusting the angle of the shovels with relation to the ground; and it consists in the details of construction and combinations of parts hereinafter set forth and claimed.

Figure 1:
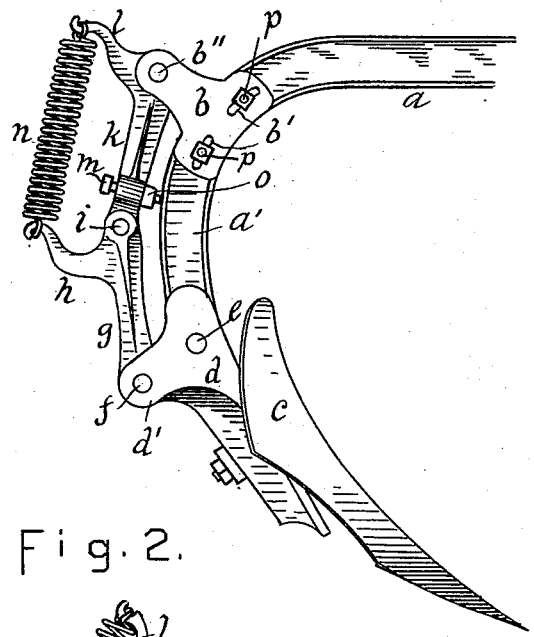
Figure 2:
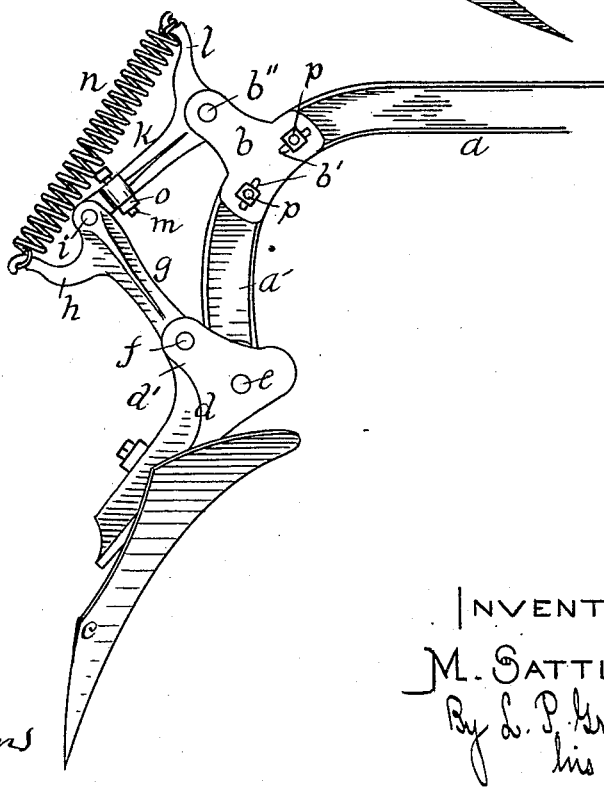

In the drawings accompanying and forming a part of this specification, Figure 1 is a side view of my device in operative position, and Fig. 2 is a similar view showing the shovel tripped to ride over an obstruction.

The shank $a'$ is a downwardly-curved continuation of beam $a$. The sleeve $d$ is pivotally secured to the shank by means of pin or bolt $e$. It carries the shovel $c$ and it has the crank extension $d'$. The bracket $b$ is secured to the beam at its curved conjunction with the shank by means of bolts $p\ p$, that extend through the beam and through slots $b'$ of the bracket. A toggle-joint composed of bars $g$ and $k$ pivots at one end on pin $b''$ in bracket $b$ and at the other end on pin $f$ in crank extension $d'$ of sleeve $d$. Its parts pivot on pin $i$, and they are each provided with laterally-extended hooked arms, bar $g$ having hooked arm $h$ and bar $k$ having hooked arm $l$. An extensible spring $n$ connects the hooked arms of the toggle-joint, and a bolt $m$ extends through bar $k$ in position to strike against the shank, and is held in any desired position of adjustment by jam-nut $o$. The spring $n$ tends to hold the parts of the toggle-joint as nearly in alignment as the shank will permit, and when the shovel is swung backward, as shown in Fig. 2, promptly returns the same to its operative position. Its strength is considerable and it is fully exerted against the backward initial motion of the shovel. The increase of tension is not proportional to the extent of the swing of the shovel, as will be understood when it is considered that beyond a certain point—*i. e.*, when the arms are directly on opposite sides of the pivots—there can be no further increase of tension, and this feature is desirable for the reason that the shovel will not be swung to its operative position after a trip with injurious force.

The shovel is adjusted to form different angles with the ground by loosening bolts $p$, sliding the bracket upward or downward on the beam, and retightening the bolts. The various parts are in alignment with the shank and to the rear of the same out of possible contact with trash that might accumulate on the shank.

I claim as new and desire to secure by Letters Patent—

1. In cultivators, in combination, a shank, a sleeve pivoted on the shank and carrying a shovel, a toggle-joint connected at its lower end to the sleeve and at its upper end to the shank, lateral arms on the bars of the toggle-joint, and a spring connecting the arms, as set forth.

2. In cultivators, in combination, beam $a$, shank $a'$, formed of a curved continuation of the beam, bracket $b$, secured adjustably to the conjunction of the beam and shank, sleeve $d$, pivotally connected with the shank and carrying shovel $c$, the toggle-joint composed of bars $g$ and $k$, the one connected pivotally with the sleeve and the other connected pivotally with the bracket, arms $h$ and $l$ on bars $g$ and $k$, respectively, and spring $n$, connecting the arms, as set forth.

3. A toggle-joint for trip-shank cultivators, comprising two bars pivotally connected, arms on the bars, and a spring connecting the arms, as set forth.

In testimony whereof I sign my name in the presence of two subscribing witnesses.

MARSHALL SATTLEY.

Attest:
A. O. MURPHY,
C. M. PARKER.